G. Jones.
Coffee Pot.
N° 63,903. Patented Apr. 16, 1867.
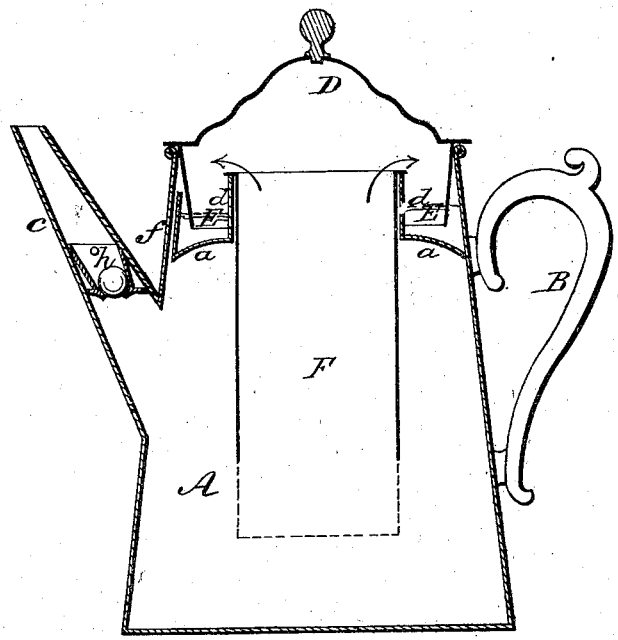
Witnesses.
John N. Shunning
A. J. Tibbits
Inventor.
George Jones
by his Attorney
John E. Earl.

UNITED STATES PATENT OFFICE.

GEORGE JONES, OF SAUGERTIES, NEW YORK.

Letters Patent No. 63,903, dated April 16, 1867.

COFFEE-POT.

The Schedule referred to in these Letters Patent and making part of the same.

TO ALL WHOM IT MAY CONCERN:

Be it known that I, GEORGE JONES, of Saugerties, in the county of Ulster, and State of New York, have invented a new Improvement in Tea and Coffee-Pots; and I do hereby declare the following, when taken in connection with the accompanying drawing and the letters of reference marked thereon, to be a full, clear, and exact description of the same, and which said drawing constitutes part of this specification, and represents a vertical central section.

This invention relates to an improvement in the pot patented by Thomas Bishop, of Plainville, Connecticut, November 1, 1859, and of which patent I am sole owner; and the invention consists, first, in the peculiar arrangement of a valve in the spout of the pot to avoid the use of a detachable cap, and second, in the construction of the condenser, whereby the fluid condensed passes directly back into the pot.

To enable others to construct and use my improvement, I will proceed to describe the same as illustrated in the accompanying drawing.

A is the body of the pot, B the handle, and C the spout; D the cover, and E the condenser; all formed substantially as in the original patent. The condenser is formed by a plate, $a$, extending around the pot upon the inside near the top, and having a hole in the centre, around which is turned up a flange, $d$, so as to form a space, E, entirely around the pot. Within the flange $d$ is set a cylinder, F, perforated at the bottom. Upon the spout-side of the chamber E a tube passage or space, $f$, is formed, opening from above the plate $a$ to the pot below, but so that the flange of the cover will set down into the condenser, leaving the tube $f$ between the flange of the lid and the side of the pot. In the spout at the proper point I fix a metallic ball valve, $h$, arranged so that when the pot stands upright the ball will close the opening, and yet so that when the pot is tipped, as for the purpose of pouring, the valve will open and permit the fluid to flow freely through the spout; thus the spout is automatically closed or opened as required, and the cap in common use is dispensed with.

The use of this pot is as follows: Place the tea or coffee in the cylinder F, and pour therethrough the requisite quantity of water, hot or cold, as the case may be. Fill the space E with cold water, say up to the red line, and when the water below is heated the steam passes up through the cylinder F to the cold water, where it is condensed, and when by condensation the chamber E shall be filled, the fluid will flow through the space $f$ back into the pot; or, after the tea or coffee is prepared, and the pot is tipped to pour therefrom, the water in the space E having received and condensed all the steam, flows over and through the space $f$ into the vessel, thus preserving entirely all the aroma that would otherwise pass off in steam.

Having thus fully described my invention, I do not broadly claim the area or condensing space E, as such is secured to me in the patent before referred to; I do not broadly claim the ball valve; but what I do claim as new and useful, and desire to secure by Letters Patent, is—

1. In combination with the space E, formed, constructed, and arranged substantially as specified, the tube space or passage $f$, substantially as and for the purpose specified.

2. In combination with the body A, constructed with a space E, cylinder F, and spout C, I claim the ball-valve H, the whole arranged in the manner substantially as herein set forth.

GEORGE JONES.

Witnesses:
JOHN E. EARLE,
ALTSIE J. TIBBITS.